May 16, 1967          P. D. SAVAGE          3,319,740

PAWL HOLDOUT FOR ONE-WAY BRAKE

Filed Nov. 16, 1965          2 Sheets-Sheet 1

INVENTOR.
PHILLIP D. SAVAGE
BY Bruns and Jenney
Attys.

May 16, 1967 P. D. SAVAGE 3,319,740
PAWL HOLDOUT FOR ONE-WAY BRAKE
Filed Nov. 16, 1965 2 Sheets-Sheet 2

INVENTOR.
PHILLIP D. SAVAGE

United States Patent Office 3,319,740
Patented May 16, 1967

3,319,740
PAWL HOLDOUT FOR ONE-WAY BRAKE
Phillip D. Savage, Malone, N.Y., assignor to Hall Ski-Lift Company, Inc., Watertown, N.Y., a corporation of New York
Filed Nov. 16, 1965, Ser. No. 508,103
9 Claims. (Cl. 188—82.4)

This invention relates generally to ratchet means for preventing reverse revolution of a ski-lift bullwheel and relates more particularly to a device for preventing the noisy engagement of the ratchet pawl with ratchet teeth during the normal rotation of the wheel.

The principal object of the invention, accordingly, is to provide means for holding the pawls of a ski-lift bullwheel ratchet device out of engagement with the ratchet teeth during the normal rotation of the wheel but which means will quickly allow the pawls to engage the teeth upon reversal of rotation of the wheel.

Another object is to provide such means which is simple and economical and which is positive and sure in operation.

Other objects and advantages will become apparent from the following description in conjunction with the appended drawings, in which.

Figure 1:
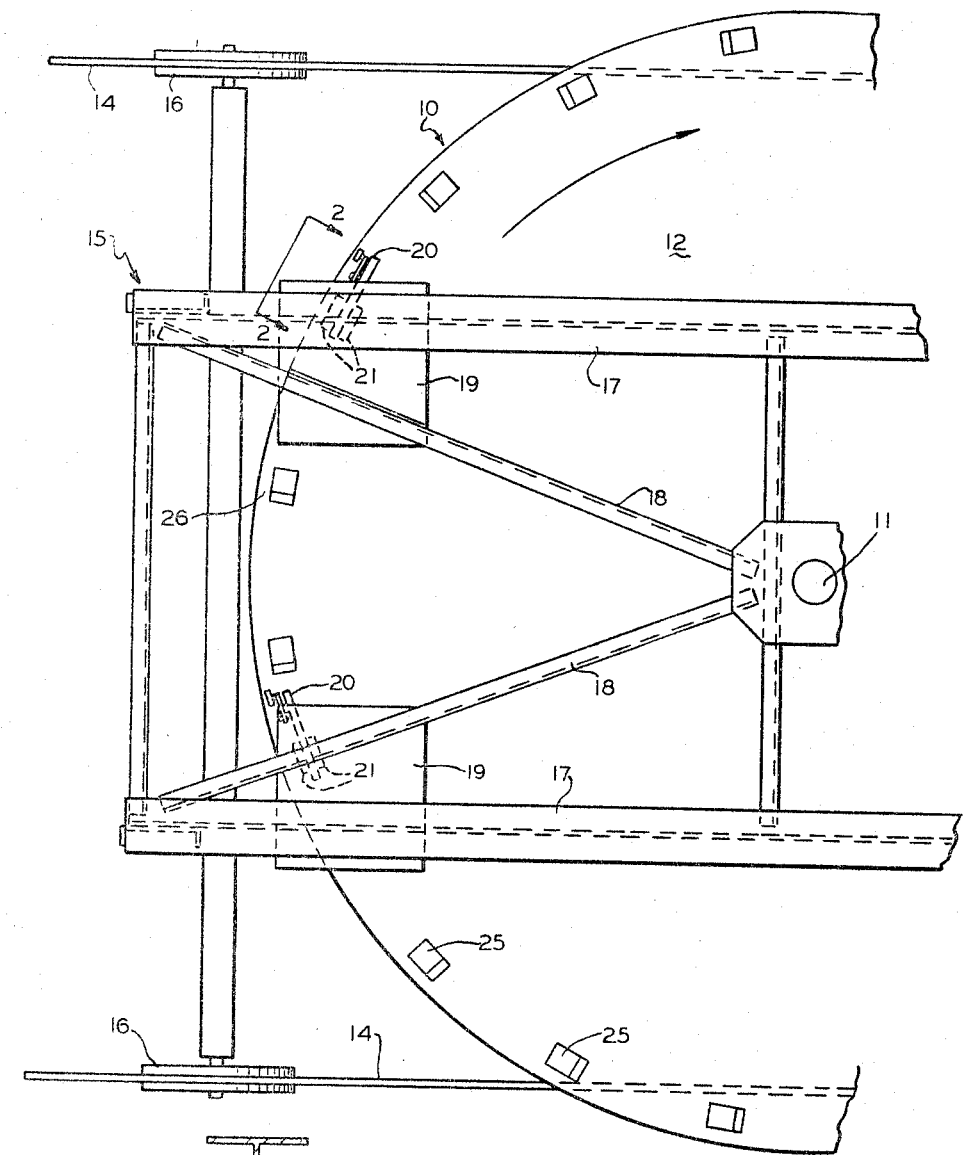
FIGURE 1 is a fragmentary top plan view of a ski-lift bullwheel showing the device of the invention.
Figure 2:
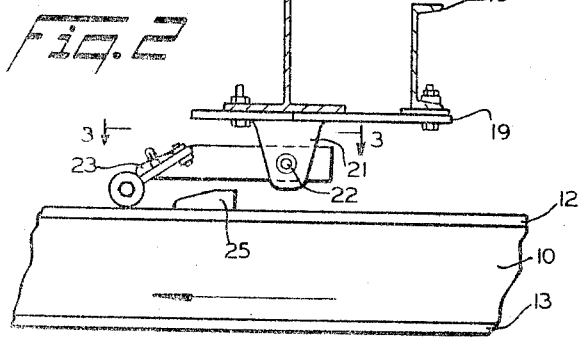
FIGURE 2 is an enlarged fragmentary side elevational view thereof as viewed in the direction of the arrows 2—2 of FIGURE 1.

In the drawings, a ski-lift bullwheel 10 is shown in FIGURE 1 in fragmentary top plan and rotatably mounted in supporting framework, not shown, on a vertically disposed shaft 11. It will be understood that bullwheel 10 is located at the up-hill extremity of the lift and, as shown in FIGURE 2, has a flat disc 12 secured to its upper side and is provided with a lower flange 13 which supports the seat or car-supporting cable 14 which passes around the wheel 10 as shown in FIGURE 1.

A cable tensioning structure 15, provided with grooved rollers 16, is shown supported in the non-rotating bullwheel supporting structure in FIGURE 1. Bolted to the members 17 and 18 of structure 15 are plates 19 to which the pawls 20 are oscillatably secured. On small lifts one plate and pawl may be omitted. The normal direction of rotation of wheel 10 is indicated by appropriate arrows in FIGURES 1, 2, 3 and 4.

Each plate 19 has a spaced pair of pendant ears 21 between which the pawl 20 is oscillatably secured by a shaft or pivot pin 22 so as to have its nose 23 gravity biased toward the top surface of disc 12 of the wheel 10. The pawl extends generally chordally of the wheel as shown.

A plurality of radially spaced ratchet teeth 25 are welded or otherwise secured to the top surface of the disc 12 so as to be opposed by the nose 23 of the pawl 20 when the direction of rotation of the wheel is reversed. Teeth 25 are spaced from the perimeter of the disc 12 leaving a cleared path 26 between teeth and the edge of the wheel.

Figure 3:
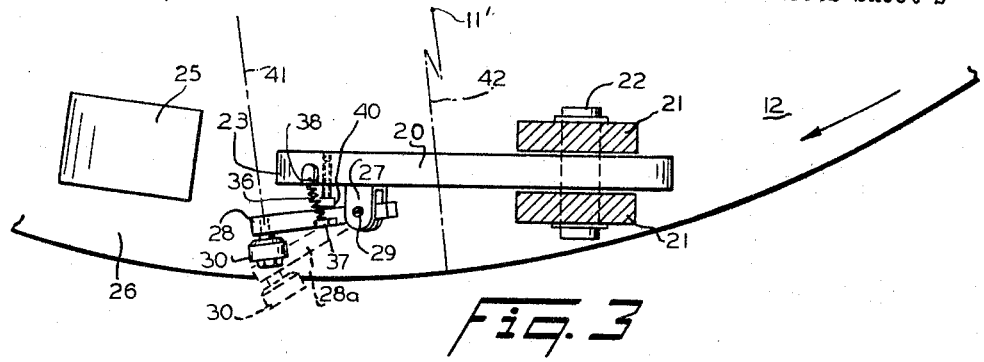
FIGURE 3 is a fragmentary sectional view on the line 3—3 of FIGURE 2, the position of the device upon reversal of direction being indicated in broken lines.
Figure 4:
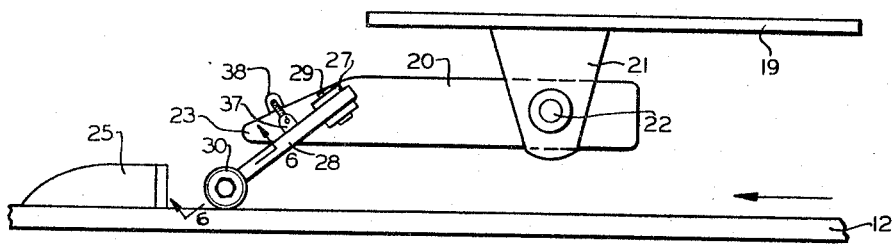
FIGURES 4 and 5 are greatly enlarged side elevational views similar to FIGURE 2 showing the device, respectively, in its normal position and in its position upon reversal of direction.

As best seen in FIGURES 3 and 4 the outer side of pawl 20 is provided with a U-shaped bracket 27 between the legs of which an arm 28 is pivotally secured by a pivot bolt 29 extending from one leg to the other and passing through the arm 28 at one end. Arm 28 is movable from a position indicated at 28 substantially alongside pawl 20 to a position shown at 28a in FIGURE 3, swung away from the pawl.

Figure 6:
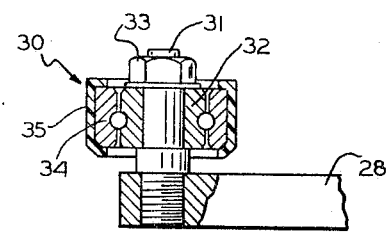
FIGURE 6 is a still further enlarged sectional view on the line 6—6 of FIGURE 4.

At the other end of arm 28 the roller 30 is rotatably secured. As best seen in FIGURE 6, a stub shaft 31 is secured to arm 28 so as to project transversely outward and the inner race 32 of a conventional ball-bearing assembly is secured to the shaft by a nut 33. The outer race 34 of the bearing assembly is provided with an annular rubber tread or boot 35 which is stretched around the outer race and can easily be removed and replaced.

The roller 30, clad in its boot 35, normally runs on the path 26 on the upper surface of disc 12. A spring 36 extends from an upwardly projecting tongue 37 on arm 28 to an upwardly projecting tongue 38 on the pawl 20, as shown, to bias the arm 28 to its normal position shown in full lines in FIGURE 3.

The pivot 29 on which arm 28 swings is inclined with respect to the surface of disc 12 so that the arm normally extends forward of the pawl 20 in the direction of normal rotation of wheel 10 and downward toward disc 12 so that pawl 20 is normally supported by roller 30 and arm 28 in a position above and clear of the teeth 25, as shown in FIGURE 4.

Figure 5:
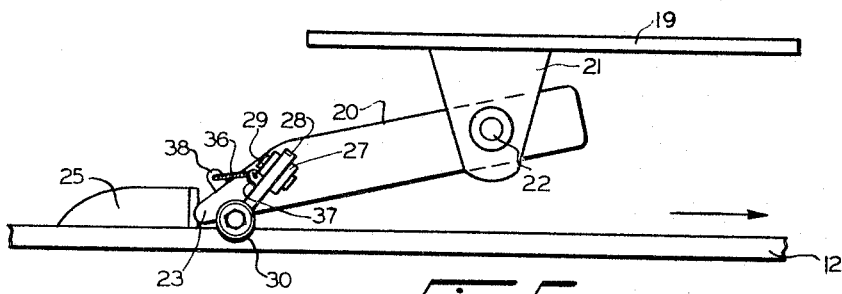

When arm 28 is swung away from the pawl 20, however, the pawl is lowered, and when the roller 30 either drops off the edge of disc 12 or arm 28 approaches a position normal to the adjacent face of pawl 20 and the pawl falls to the position shown in FIGURE 5 and may be engaged by the teeth 25.

A setscrew 40 is threaded into the pawl 20, as shown in FIGURE 3, and its head is engageable by the arm 28 to provide adjustable means for regulating the normal angle between arm 28 and pawl 20. Screw 40 limits the approach of arm 28 to parallelism with pawl 20 and thereby ensures that the axis of rotation of roller 30 extended, shown at 41 in FIGURE 3, passes to one side of the axis of rotation 11′ of the wheel, shown at the end of a foreshortened radius 42 in FIGURE 3. This angularity of the axis of rotation of roller 30, exaggerated in FIGURE 3, is forward of the axis 11′, in the direction of normal rotation of the wheel as viewed in this figure.

In operation, when the wheel 10 is rotating normally the teeth 25 pass under the pawl 20 and roller 30 with respect to the motion of the wheel is trailing the end of arm 28 secured to the pawl and so the roller tends to move toward the center of wheel 10.

When the wheel 10 reverses its direction of rotation, however, the angularity of the axis of the roller directs the rotation of the roller 30 normal to axis 41 toward the edge of the wheel. The rubber boot 35 on the roller ensures good frictional contact with disc 12. When the reverse rotation carries roller 30 to the position shown in broken lines in FIGURE 3, the roller drops off the edge of the wheel and pawl 20 is lowered so as to engage one or another of the teeth 25 and stop the reverse rotation of wheel 10.

When the failure which has caused the reversal of rotation of wheel 10 has been corrected and wheel 10 resumes its rotation in normal direction, the spring 36 assists the roller 30 to mount the edge of the wheel and resume its position on track 26 with arm 28 biased against the setscrew 40. Setscrew 40 may be used to limit the approach of arm 28 to the pawl 20 so that the end of the arm carrying roller 30 clears the teeth 25.

The axis of rotation of roller 30 always passes to one side of the axis of rotation of the wheel so that some scuffing action of boot 35 against the surface of disc 12 occurs, but the boot 35 may be easily and economically replaced.

As will be apparent to those familiar with the art, the invention may be embodied in other specific forms without departing from the spirit or essential characteristics thereof. The embodiment disclosed therefore is to be considered in all respects as illustrative rather than restrictive, the scope of the invention being indicated by the appended claims.

What is claimed is:

1. A counterrevolution preventing device, comprising: a wheel rotatably supported in a stationary frame, a pawl oscillatably supported in the frame and extending from its support in the direction of normal rotation of the wheel, ratchet teeth on the side of the wheel, the pawl being biased toward the wheelside to engage the teeth upon reversal of rotation of the wheel, and pawl lifting means secured to the pawl including a roller normally engaging the wheel side in a path radially spaced from the teeth and normally supporting the pawl disengaged from the teeth, said lifting means being swingable away from the pawl to drop the pawl into engagement with the teeth upon reversal of rotation of the wheel, the roller having its axis of rotation extended passing to the side of the axis of rotation of the wheel in the direction of the normal direction of rotation of the wheel, whereby, during normal rotation, the roller is constrained to the path alongside the teeth to hold the pawl disengaged from the teeth by the frictional engagement of the roller with the wheel and, upon reversal of rotation of the wheel, the roller is directed away from the pawl thereby allowing the pawl to engage the ratchet teeth.

2. In a device having a wheel rotatably supported in a stationary frame, the wheel having radially spaced ratchet teeth on one side, the device having a pawl carried by the frame, the pawl being oscillatable to a disengaged position swung away from the wheel side and disengaged from the teeth during normal rotation of the wheel and being biased to a position engageable by said teeth during reversal of rotation of the wheel; a pawl silencer comprising: an arm pivotally secured at one end to the pawl and having a roller rotatably secured to the arm at its other end, the axis of the arm pivot being inclined with respect to the long axis of the pawl so that the arm normally extends alongside the pawl toward the side of the wheel with the roller in rolling contact with the wheel side alongside the teeth to hold the pawl in disengaged position, the arm being swingable away from the pawl so as to allow the pawl to engage the teeth, the roller normally projecting forward from the pawl in the direction of normal rotation of the wheel so as to normally maintain the pawl in disengaged position, the axis of rotation extended of the roller passing to one side of the axis of rotation of the wheel, whereby the arm is swung away from the pawl by frictional engagement of the roller with the wheel upon reversal of rotation of the wheel.

3. The pawl silencer defined in claim 2 characterized by having the wheel ratchet teeth narrowly spaced from the wheel perimeter forming a narrow roller track between teeth and perimeter, whereby the roller runs off the edge of the wheel upon reversal of direction of rotation of the wheel to shorten the distance the wheel rotates in reverse direction before the pawl returns to its position engagably by the teeth, and spring means biasing the arm to its normal position.

4. The pawl silencer defined in claim 3 characterized by having adjustable means on the pawl for limiting movement of the arm toward the pawl.

5. The pawl silencer defined in claim 4 having the roller covered with a resilient material to increase its frictional contact with the wheelside.

6. In a ski-lift back up stop device a bullwheel having a stationary frame for rotatably supporting the horizontally disposed wheel, a pawl oscillatably supported in the frame and extending chordally above the wheel, a plurality of radially spaced ratchet teeth on the top side of the wheel adapted to swing the pawl up when the wheel rotates in its normal direction and to be engaged by the pawl when the wheel reverses direction, the teeth being spaced from the perimeter of the wheel to provide a flat roller track adjacent the edge of the wheel, a roller adapted to normally run in the track, the roller being rotatably secured to one end of an arm, the other end of the arm being pivotally secured to the pawl so as to normally extend alongside and forward of the pawl in the direction of the normal rotation of the wheel and to thereby carry the pawl swung away from the wheel teeth, the arm being adapted to be pivotally swung away from the pawl to allow the pawl to fall into engagement with the teeth, the roller being secured to the arm so that its axis extended passes forward in the direction of normal wheel rotation of the axis of rotation of the wheel, whereby when the wheel reverses direction the roller runs off the edge of the wheel allowing the pawl to drop and be engaged by the teeth.

7. The device defined in claim 6 characterized by having spring means for biasing the roller arm to its normal position alongside the pawl, whereby upon renewal of the normal rotation of the wheel the roller is assisted in resuming its normal path along the track.

8. The device defined in claim 7 characterized by having stop means for adjustably limiting the movement of the arm toward the pawl whereby the normal position of the roller with respect to the track may be regulated.

9. The device defined in claim 8 wherein the roller comprises a ball-bearing assembly covered with an annular boot of rubbery material whereby the frictional engagement between wheel and roller is enhanced.

References Cited by the Applicant

UNITED STATES PATENTS 1,492,668    5/1924    Bond.
2,828,647    4/1958    Reinsch.

MILTON BUCHLER, *Primary Examiner.*

G. E. A. HALVOSA, *Assistant Examiner.*